(12) United States Patent
Kuwaba

(10) Patent No.: US 7,700,053 B2
(45) Date of Patent: Apr. 20, 2010

(54) REFORMING DEVICE

(75) Inventor: Koichi Kuwaba, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1170 days.

(21) Appl. No.: 11/281,600

(22) Filed: Nov. 18, 2005

(65) Prior Publication Data
US 2006/0107594 A1 May 25, 2006

(30) Foreign Application Priority Data

Nov. 24, 2004 (JP) ............................. 2004-339620

(51) Int. Cl.
*B01J 10/00* (2006.01)
(52) U.S. Cl. .................. 422/189; 422/187; 422/188; 422/190; 422/197; 422/198; 422/211; 422/202; 422/203; 422/204; 422/180; 422/181; 422/168; 429/19; 429/20; 429/12; 48/61; 48/127.9; 423/651; 423/648.1; 423/650; 423/652; 423/655
(58) Field of Classification Search ......... 422/187–190, 422/197–198, 211, 202–204
See application file for complete search history.

(56) References Cited

U.S. PATENT DOCUMENTS

RE39,675 E * 6/2007 Kudo et al. ................. 422/198

2003/0054213 A1 * 3/2003 Ishikawa .................... 429/19

FOREIGN PATENT DOCUMENTS

| JP | 2003-252604 | 9/2003 |
|---|---|---|
| JP | 2003-321206 | 11/2003 |
| JP | 2004-115321 | 4/2004 |
| JP | 2004-288434 A | 10/2004 |
| JP | 2005-5010 A | 1/2005 |
| JP | 2005-60129 A | 3/2005 |
| JP | 2005-104776 | 4/2005 |
| JP | 2005-108651 | 4/2005 |

* cited by examiner

*Primary Examiner*—Jennifer Michener
*Assistant Examiner*—Kaity V. Handal
(74) *Attorney, Agent, or Firm*—Oblon, Spivak, McClelland, Maier & Neustadt, L.L.P.

(57) ABSTRACT

A reforming device includes a reforming portion generating reformed gas from a mixed gas, in which fuel and steam are mixed and including a reforming portion loop-back channel provided at the reforming portion so as to extend along an axis line thereof, a combusting portion provided at an inner circumference of the reforming portion in order to generate combustion gas, a combustion gas channel including a loop-back channel within which the combustion gas flows, an evaporating portion generating steam by heating water and supply steam to the reforming portion; and a carbon monoxide reducing portion provided at an outer circumferential wall of the evaporating portion in order to reduce a level of carbon monoxide in the reformed gas that has been exhaled by the reforming portion, and in order to supply such reformed gas to a fuel cell.

18 Claims, 5 Drawing Sheets

REFORMING DEVICE

CROSS REFERENCE TO RELATED APPLICATIONS

This application is based on and claims priority under 35 U.S.C. § 119 to Japanese Patent Application 2004-339620, filed on Nov. 24, 2004, the entire content of which is incorporated herein by reference.

FIELD OF THE INVENTION

This invention generally relates to a reforming device for generating a reformed gas from a mixture of supplied fuel and steam.

BACKGROUND

A known reforming device generates reformed gas, which is a so-called hydrogen rich gas, from a mixture of supplied fuel (e.g., natural gas, liquefied petroleum gas, kerosene, methanol or the like) and steam. The generated reformed gas is supplied to, for example, a fuel electrode of a fuel cell. The fuel cell generates power by use of hydrogen existing in the reformed gas, which is exhaled to he fuel electrode, and oxygen existing in the air, which is exhaled to an air electrode.

A known reforming device includes a reforming portion generating a reformed gas, in which fuel and steam are mixed, and exhausting the reformed gas, a combusting portion generating combustion gas, which is used for heating the reforming portion, a combustion gas channel through which the combustion gas flows, a evaporating portion generating the steam by heating water and supplying the steam to the reforming portion, a carbon monoxide reducing portion reducing the level of carbon monoxide in the reformed gas, which is exhaled by the reforming portion, and supplying the reformed gas to the fuel portion.

According to a hydrogen generating device (reforming device) disclosed in JP2003-252604A, as shown in FIG. 1, a tubular reforming vessel 10 (reforming portion) is installed so as to surround a combustion chamber 17, and a tubular pass 12 flowing a fuel gas on the periphery of the reforming vessel 10 and a tubular evaporating chamber 28 (evaporating portion) on the periphery of the pass 12 flowing the fuel gas are coaxially installed, respectively. The evaporating chamber 28 consists of a first evaporating chamber 18 and a second evaporating chamber 22 installed away from the first evaporating chamber 18 by a partition wall 21. A plurality of open holes 23 is formed on the partition wall 21.

The single tubular cylinder type reforming apparatus (reforming device) disclosed in JP2003-321206A includes an emission tube 14 and a burner 18 (combusting portion). Specifically, the emission tube 14 is positioned inside of circular cases 61 through 66, which are provided perpendicularly, coaxially therewith, the burner 18 is positioned at the upper portion of the emission tube 14. Further, channels are formed between each of the circular cases 61 trough 66, and such channels are filled with a reforming catalyst. The single tubular cylinder type reforming apparatus further includes an outlet channel (combustion gas channel) 80, a channel 50, a CO transformer catalyst layer 10 (a part of a carbon monoxide reducing portion), a water heating channel 34, a heating channel 48, a connecting tube 25 and a CO removal catalyst layer 12 (a part of the carbon monoxide reducing portion). Specifically, combustion gas is inhaled into the outlet channel 80 and exhaled through a heat transmission channel (combustion gas channel) 27, which is formed toward outside of the reforming apparatus, after flowing within outer circumferential portion of the emission tube 14. The channel 50 is formed at an outer circumference of the reforming catalytic layer 8, within which the reforming catalyst is filled, and the channel 50 is connected to the reforming catalytic layer 8 at each lower end portion thereof. The CO transformer catalyst layer 10 is provided at an outer circumference of the channel 50, and the CO transformer catalyst layer 10 is connected to the channel 50 at each upper end portion thereof. The water heating channel 34, provided at an upper circumference of the heat transmission channel 27 at upper portions of the circular cases 61 through 66, heats water by means of the heat emitted from the burner 18. The heating channel 48 is formed at an outer circumference of the CO transformer catalyst layer 10 so as to be connected to an inlet 26 at a lower end of the heating channel 48 and connected to an opening of the reforming catalytic layer 8 at an upper end of the heat channel 48. The water heating channel (evaporating portion)34 is connected to an lower end portion of the heating channel 48 by means of a connecting tube 25. The CO removal catalyst layer 12 is provided at an outer circumference of the water heating channel 34.

According to the hydrogen generating device disclosed in JP2003-252604A, heat is exchanged between a basic ingredient X and water Y flowing within the evaporating chamber (evaporating portion)28; and combustion gas flowing within the combustion gas channel 12 in order to preheat the basic ingredient X and the water Y. However, because the evaporating chamber 28 is positioned at most outer circumference of the device, the heat transmitted to the basic ingredient X and the water Y may be emitted outside of the device through an outer circumferential wall of the evaporating chamber 28. Thus, efficiency of the heat exchange has been decreased.

Further, according to the single tubular cylinder type reforming apparatus disclosed in JP2003-321206A, because the CO removal catalyst layer 12 is provided at an outer circumference of the water heating channel 34, which is provided at an outer circumference of the outlet channel (combustion gas channel) 80, a chance can be reduced of the heat, which is emitted outward from the outlet channel 80, being emitted outward from through the outer circumferential wall of the water heating channel 34. Thus, the heat can be exchanged with appropriate efficiency. However, inside of the outlet channel 80, the heating channel 48 and the CO transformer catalyst layer 10 are provided in that order, the heat emitted inward from the outlet channel 80 is transmitted to the source gas flowing through the heating channel 48, and further transmitted to the CO transformer catalyst layer 10. Thus, because a temperature of the combustion gas cannot be increased to a required temperature, and water flowing within the water heating channel 34 cannot be heated appropriately, it takes some time to start the device, as a result, a level of starting performance may be decreased. In order to increase the level of the starting performance, the level of the combustion load can be increased, or the amount of water supplied to the device can be reduced. However, when the combustion load increased, the efficiency may be decreased, and when the amount of water is reduced, deterioration by carbon deposition on the reforming catalyst, which reaches a high temperature; reduction on a degree of conversion and increment of consistency of carbon monoxide within CO transformer catalyst layer 10 may occur.

Thus, because the heat emitted inward from the outlet channel 80 is transmitted to source gas flowing within he heating channel 48 and further transmitted to the CO transformer catalyst layer 10, a difference of responsibilities exists between the combustion gas and the reformed gas flowing within the CO transformer catalyst layer 10, consequently, heat may be imbalanced when the load is changed, as a result, consistency of the carbon monoxide may be increased due to change of the temperature.

A need thus exists to provide a reforming device that can increase efficiency of the heat exchange by reducing the heat emitted from the evaporating portion in which water is heated by means of the combustion gas, at the same time, even when the load is changed or the environment is changed, the device can stably controls with high robustness.

SUMMARY OF THE INVENTION

According to an aspect of the present invention, a reforming device comprises a reforming portion formed in a tube shape, generating reformed gas from a mixed gas, in which fuel and steam are mixed, exhaling such reformed gas and including a reforming portion loop-back channel provided at the reforming portion so as to extend along an axis line thereof, a combusting portion provided at an inner circumference of the reforming portion in order to generate combustion gas used for heating the reforming portion, a combustion gas channel including a loop-back channel within which the combustion gas flows, the loop-back channel including an inner circumferential channel, which is provided so as to be along an inner circumferential wall of the reforming portion, and an outer circumferential channel, which is provided at outer circumference along an outer circumferential wall of the reforming portion, the inner circumferential channel being connected to the outer circumferential channel, an evaporating portion provided at an outer circumferential wall of the outer circumferential channel in order to generate steam by heating water and supply steam to the reforming portion; and a carbon monoxide reducing portion provided at an outer circumferential wall of the evaporating portion in order to reduce a level of carbon monoxide in the reformed gas that has been exhaled by the reforming portion, and in order to supply such reformed gas to a fuel cell.

According to another aspect of the present invention, a reforming device comprises a reforming portion formed in a tube shape, generating reformed gas from a mixed gas, in which fuel and steam are mixed, exhaling such reformed gas and including an inner flow path extending along an axis line of the reforming portion and an outer flow path extending along an axis line of the reforming portion and provided at an outer circumference of the inner flow path so as to extend along an axis line of the inner flow path, the inner flow path being connected to the outer flow path at one end thereof, a combusting portion provided at an inner circumference of the reforming portion in order to generate combustion gas used for heating the reforming portion, a combustion gas channel including an inner circumferential channel and an outer circumferential channel within which the combustion gas flows, the inner circumferential channel being provided so as to be along an inner circumferential wall of the reforming portion, and the outer circumferential channel including a first channel, which is positioned along the outer circumferential wall of the reforming portion, and a second channel, which is provided at an outer circumference of the first channel so as to be loop-backed and connected thereto, an evaporating portion provided at an outer circumferential wall of the second channel in order to generate steam by heating water and supply steam to the reforming portion; and a carbon monoxide reducing portion provided at an outer circumferential wall of the evaporating portion in order to reduce a level of carbon monoxide in the reformed gas that has been exhaled by the reforming portion, and in order to supply such reformed gas to a fuel cell.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

1) First Embodiment

Figure 1:
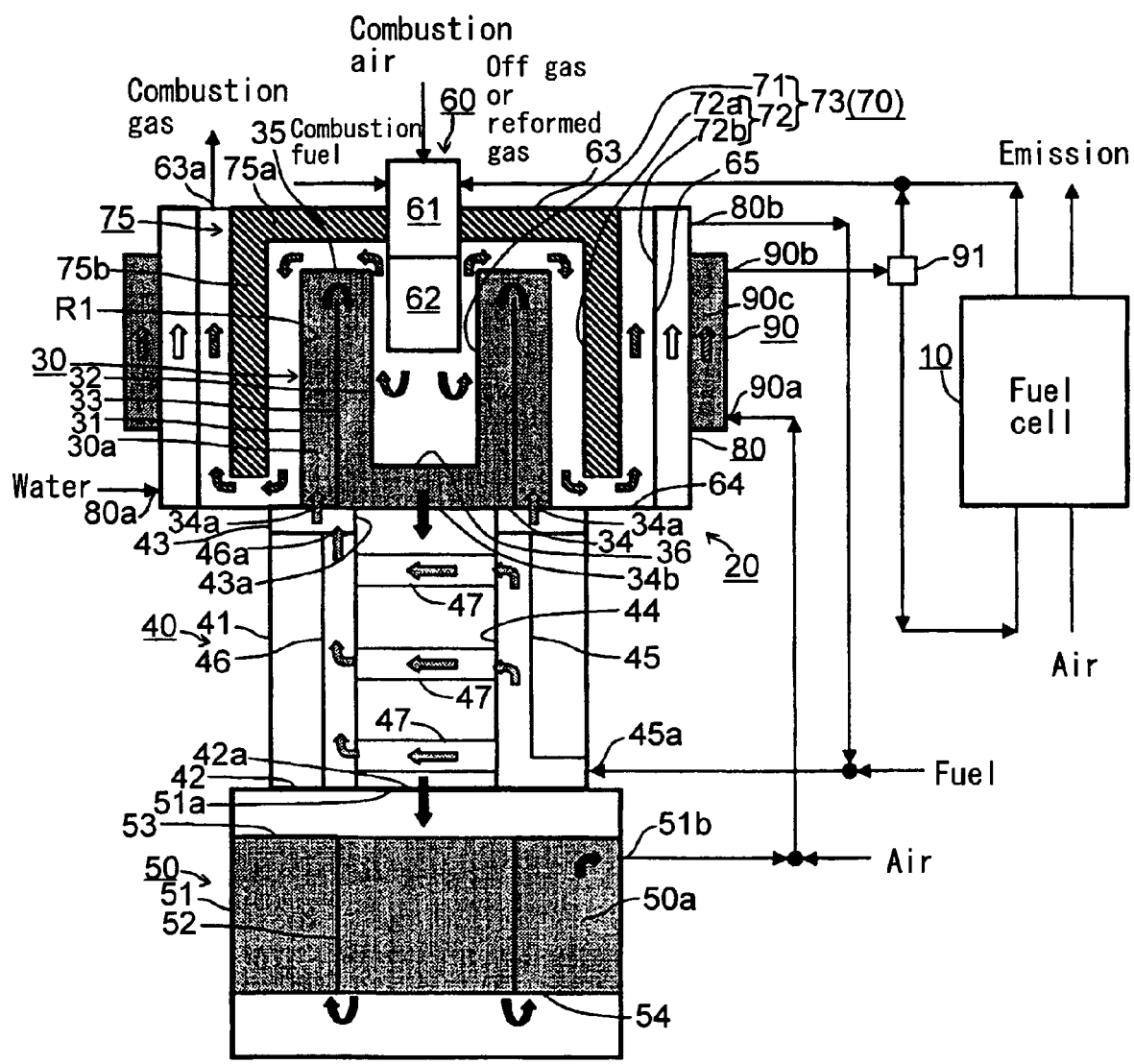
FIG. 1 illustrates a schematic diagram indicating a fuel cell system to which a reforming device of the first embodiment is applied.

A fuel cell system to which a first embodiment of the reforming device is applied will be explained. FIG. 1 illustrates a schematic view indicating elements of a fuel cell system. The fuel cell system includes a fuel cell 10 and a reforming device 20, and the reforming device 20 generates and supplies hydrogen gas, which is required by the fuel cell 10. Specifically, the fuel cell 10 includes a fuel electrode and an air electrode, and reformed gas from a carbon monoxide purifying portion 90 is inhaled (hereinafter referred to as a CO purifying portion) into the fuel electrode of the fuel cell 10. Further, air from the exterior is supplied to the air electrode of the fuel cell 10. In this configuration, the fuel cell 10 generates power by reacting hydrogen gas existing in the reformed gas with oxygen gas existing in the air.

The reforming device 20 includes a reforming portion 30, a cooling portion 40, a carbon monoxide shift reaction portion 50 (hereinafter referred to as a CO shift portion), a combusting portion 60, a combustion gas channel 70, a heat insulating portion 75, an evaporating portion 80 and a CO purifying portion 90.

The reforming portion 30 generates reformed gas from inhaled mixed gas, which is a mixture of fuel and steam and has been inhaled into the reforming portion 30 from the exterior, and supplies the reformed gas to the cooling portion 40. The fuel includes natural gas, liquefied petroleum gas, kerosene, gasoline and methanol. This embodiment will be explained on the basis of a scenario where natural gas is used as the fuel. The reforming portion 30 is formed in a tube shape, for example a cylinder shape, and having a bottom portion such as a bottom plate 34, and the bottom plate 34 is engaged with and coaxially fixed to a cooling portion 40, which will be explained later.

A tube portion of the reforming portion 30 includes an outer tube 31, an inner tube 32 provided at an inner circumference of the outer tube 31 and positioned coaxially relative to the outer tube 31, and a partition 33 formed in a tube shape and provided between the outer tube 31 and the inner tube 32.

Specifically, the partition 33 is positioned coaxially relative to the outer tube 31 and the inner tube 32, and provided therebetween in order to divide a space formed between the inner tube 32 and the outer tube 31 in a radial direction. More specifically, the outer tube 31 is provided at an outer rim of a bottom plate 34, which is formed in a circular shape. The outer tube 31 is positioned approximately perpendicular relative to the bottom plate 34. The partition 33 is provided on the inside of the outer rim of the bottom plate 34 and positioned approximately perpendicular relative to the bottom plate 34. Further, as shown in FIG. 1, an outer upper plate 35, which is formed in a ring shape, is provided at the top end of the outer tube 31 and the inner tube 32. Specifically, an outer rim of the outer upper plate 35 is attached to the outer tube 31, and, in circumstance where the inner tube 32 extends in an approximately vertical direction from the inner rim of the outer upper plate 35, an inner rim of the outer upper plate 35 is attached to the inner tube 32. A lower end portion of the inner tube 32 is covered by means of the inner upper plate 36. A top end portion of the partition 33 is positioned so as to be separated from the outer upper plate 35. Further, a mixed gas inlet 34a is formed between the partition 33 and the outer tube 31. Specifically, the mixed gas inlet 34a is connected to a circular manifold 43 in order to inhale mixed gas, in which fuel and steam are mixed. A reformed gas outlet 34b of the bottom plate 34 is covered by a filter, which maintains a catalyst 30a, and serves as a reformed gas outlet through which the reformed gas can be exhaled. Thus, the reforming portion 30 includes a reforming portion loop-back channel R1, which is formed in a tube shape. Specifically, the reforming portion loop-back channel R1 is located inside the tube portion and extends along a line of an axis of the tube portion of the reforming portion 30. More specifically, the reforming portion loop-back channel R1 includes an outer flow path, which is formed between the outer tube 31 and the partition 33, and an inner flow path, which is formed between the partition 33 and the inner tube 32.

The reforming portion loop-back channel R1 of the reforming portion 30 is filled with a catalyst 30a (e.g., catalyst of Ru series or Ni series). Within the reforming portion loop-back channel R1, mixed gas of fuel supplied from the mixed gas inlet 34a and steam react with the catalyst 30a and are reformed so as to generate hydrogen gas and carbon monoxide gas. This reaction is a so-called steam reforming reaction. At the same time, the carbon monoxide, which is generated by the steam reforming reaction, reacts with steam so as to generate hydrogen gas and carbon dioxide. This reaction is a so-called carbon monoxide shift reaction. These reformed gases, hydrogen gas and carbon dioxide, are exhaled through a reformed gas outlet 34b to the cooling portion 40.

At the cooling portion 40, a temperature of the reformed gas that is exhaled by the reforming portion 30 is reduced by means of the mixed gas, in which fuel and steam are mixed, and such cooled reformed gas is exhaled by the cooling portion 40. The cooling portion 40 is fixed to the CO shift portion 50 so as to be coaxial therewith. The cooling portion 40 includes a tube housing 41, which is formed in, for example, a cylinder shape, a bottom plate 42, a circular manifold 43, an inner tube 44, manifolds 45 and 46 and plural heat exchange pipes 47. Specifically, the bottom plate 42 is formed in a circular shape and includes a reformed gas outlet 42a; the circular manifold 43 is provided at an upper portion of the tube housing 41 and includes a reformed gas inlet 43a; the inner tube 44 is provided at a bottom portion of the circular manifold 43; and each of the heat exchange pipes 47 is provided between the manifolds 45 and 46 so as to connect them. The manifold 45 includes an inlet 45a for inhaling the mixed gas in which fuel and steam (or water) are mixed. Specifically, the steam is exhaled through the water outlet 80b of the evaporating portion 80. The manifold 46 includes an outlet 46a, which is connected to the circular manifold 43.

The mixed gas that has been inhaled through the mixed gas inlet 45a is exhaled, and after flowing within the manifold 45, the heat exchange pipe 47, and the manifold 46, and then through the outlet 46a, the circular manifold 43 and the mixed gas inlet 34a of the reforming portion 30, the mixed gas is inhaled into the reforming portion 30. On the other hand, the reformed gas exhaled through the reformed gas outlet 34b of the reforming portion 30 is further exhaled, and after flowing within the reformed gas inlet 43a of the circular manifold 43, and the inner tube 44 and then through the reformed gas outlet 42a, the reformed gas is inhaled into the to the CO shift portion 50. At this point, heat is exchanged between the mixed gas and the reformed gas through the heat exchange pipe 47. Specifically, the temperature of the mixed gas is increased by the reformed gas through the heat exchange pipe 47, and the temperature of the reformed gas is reduced by the mixed gas through the heat exchange pipe 47.

The CO shift portion 50 reduces the level of the carbon monoxide in the reformed gas that has been inhaled thereinto from the cooling portion 40. Specifically, the CO shift portion 50 is fixed to a base, which is not shown in FIG. 1, and includes a case 51, which is formed in a column shape, and an inner tube 52, which is positioned so as to be coaxial with the case 51. An upper end of the inner tube 52 is connected to an inner rim of the supporting member 53, which is formed in a ring shape and connected to an inner circumferential surface of the case 51 at an outer rim of the supporting member 53. A reformed gas inlet 51a is formed at an upper surface of the case 51, and a reformed gas outlet 51b is formed on an outer circumferential surface of the case 51. The inner tube 52 of the CO shift portion 50 and a space between the inner tube 52 and the case 51 are filled with a catalyst 50a (e.g., catalyst of Cu—Zn series). The catalyst 50a is supported by the supporting member 54 having a filter that is attached to the inner rim of the outer tube 51 at an outer peripheral edge of the filter.

Within the CO shift portion 50, the reformed gas that has been inhaled thereinto from the cooling portion 40 is exhaled through the reformed gas outlet 51b after flowing through the reformed gas inlet 51a, and within the inner tube 52, and then within a space between the inner tube 52 and an inner circumferential wall of the case 51, the reformed gas inhaled into the CO purifying portion 90. At this point, carbon monoxide included in the reformed gas and steam react with each other by means of the catalyst 50a so as to be reformed into hydrogen gas and carbon dioxide gas. This reaction is a so-called carbon monoxide shift reaction. The carbon monoxide shift reaction is an exothermic reaction.

The combusting portion 60 generates combustion gas used for heating the reforming portion 30, and a lower portion of the combusting portion 60 is positioned within an inner circumference of the reforming portion 30. Specifically, the combusting portion 60 includes a burner main unit 61 and a burner combusting portion 62. The combusting portion 60 is provided in a manner where the burner main unit 61 is fixed to an inner circumferential surface an upper plate 63, which is formed in a ring shape. The outer peripheral end of the upper plate 63 is connected to an upper end of the case 65. Specifically, a bottom end of an inner circumference of the case 65 is connected to an outer rim of the bottom plate 34 of the reforming portion 30, and a bottom end of the case 65 is connected to an outer rim of the bottom plate 64, which is formed in a ring shape and connected to an upper surface of the cooling portion 40. In this configuration, combustion fuel, combustion air, and off-gas or reformed gas, are inhaled into the burner main unit 61 from an upward direction, and these gases are ignited with an ignition means (not shown) provided at a lower portion of the combusting portion 60. Specifically, the burner combusting portion 62 is formed in a tube shape and attached to a lower portion of the burner main unit 61. Thus, the combustion fuel, the combustion air, and the off-gas, or the reformed gas, are combusted within the burner combusting portion 62.

In this configuration, the combusting portion 60 combusts the combustion fuel, the combustion air, and the off-gas, or the reformed gas, inhaled through the upper portion of the burner main unit 61, in order to generate combustion gas, and such gas is exhaled through an opening of the burner combusting portion 62. Further, the combustion gas flows through the combustion gas channel 70, and is then exhaled through the combustion gas outlet 63*a*, which is formed on the upper plate 63. The combustion gas channel 70 includes a loop-back channel 73 having an inner circumferential channel 71 and an outer circumferential channel 72. Specifically, as shown in FIG. 1, the inner circumferential channel 71 is formed so as to extend in an upward direction along an inner circumferential wall of the reforming portion 30 in a vertical direction, and the outer circumferential channel 72 is formed continuously from the inner circumferential channel 71 and then bends so as to extend in a lower direction along an outer circumferential wall of the reforming portion 30. More specifically, the outer circumferential channel 72 includes a first channel 72*a* and a second channel 72*b*. The first channel 72*a* extends along the outer circumferential wall of the reforming portion 30, and the second channel 72*b* extends along an outer circumference of the first channel 72*a* so as to be connected thereto. In this embodiment, the inner circumferential channel 71, the first channel 72*a* and the second channel 72*b* are formed in a circular shape, the inner circumferential channel 71 is connected to the first channel 72*a* at upper portions thereof, and the first channel 72*a* is connected to the second channel 72*b* at lower portions thereof. Further, the second channel 72*b* is formed between a heat insulating portion 75 and the case 65.

The heat insulating portion 75, having an upper heat insulating portion 75*a* and a side heat insulating portion 75*b*, is positioned so as to cover the inner circumferential channel 71 and the first channel 72*a*. Specifically, the upper heat insulating portion 75*a* is attached to the upper plate 63 along the lower surface of the upper plate 63 so as to cover the inner circumferential channel 71 and the first channel 72*a*. More specifically, the side heat insulating portion 75*b* is positioned so as to extend from the lower surface of the upper plate 63 in a lower-vertical direction. The side heat insulating portion 75*b* is positioned to cover the first channel 72*a*. Thus, at the upper portion of the reforming device 20, the inner circumferential channel 71, the reforming portion 30, the first channel 72*a*, the side heat insulating portion 75*b* and the second channel 72*b* are provided in that order coaxially relative to the combusting portion 60.

The heat insulating portion 75 can reduce the chances of heat that has been generated within the first channel 72*a*, the inner circumferential channel 71 and the first channel 72*a* from being emitted outward, and the heat can be emitted inward toward the reforming portion, as a result, the heat can be effectively exchanged within the reforming portion 30. Further, the heat insulating portion 75 can reduce the chances of heat that has been generated within the second channel 72*b* from being emitted inward, and the heat can be emitted outward toward the evaporating portion 80. As a result, the heat can be effectively exchanged within the evaporating portion 80.

In the evaporating portion 80, water is heated in order to generate steam, and such steam is supplied through the cooling portion 40 to the reforming portion 30. Specifically, the evaporating portion 80 is formed in a tube shape, for example a cylinder shape, and provided so as to contact and cover the outer circumferential wall of the second channel 72*b*. A water inlet 80*a* is provided at a lower side wall portion of the evaporating portion 80, and a water outlet 80*b* is provided at an upper side wall portion of the evaporating portion 80. In this configuration, water is introduced through the water inlet 80*a*, and after flowing through the evaporating portion 80, it is then let out through the water outlet 80*b*. In these circumstances, the combustion gas within the second channel 72*b* and water or steam within the evaporating portion 80 that abuts onto the second channel 72*b*, flow so as to be concurrent. Thus, water whose temperature is relatively low (e.g., 20° C.) when it is let out trough the water inlet 80*a* is heated so as to be boiled (at 100° C.) by heat exchanging with combustion gas that has been heated and flows within the second channel 72*b*. After the heat of the combustion gas is exchanged with the water, the temperature of the combustion gas is reduced so as to be at approximately the same as the temperature of the water let out through the water outlet 80*b* (100° C.). The CO purifying portion 90 reduces the level of the carbon monoxide in the reformed gas exhaled by the CO shift portion 50, and such reformed gas is exhaled so as to be inhaled by the fuel cell. Specifically, the CO purifying portion 90 is a carbon monoxide reducing portion, is formed in a tube shape, for example in a cylinder shape, and is provided to cover the outer circumferential wall of the evaporating portion 80, and to make contact therewith. Further, a reformed gas inlet 90*a* is provided at a lower side wall portion of the CO purifying portion 90, and a reformed gas outlet 90*b* is provided at an upper side wall portion of the CO purifying portion 90. The CO purifying portion 90 is filled with a catalyst 90*c* (e.g., Ru series or Pt series catalyst), and reformed gas, which has been introduced through the reformed gas inlet 90*a*, and is outlet from the reformed gas outlet 90*b* after flowing within the CO purifying portion 90. Further, the reformed gas exhaled through the reformed gas inlet 90*a* is a mixture of the reformed gas that has been let out from the CO shift portion 50 and air.

Thus, the reformed gas that has been introduced into the CO purifying portion 90 reacts with oxygen in the air so as to become carbon dioxide. This reaction is an exothermic reaction and is enhanced by means of the catalyst 90*c*. Thus, the level of the carbon monoxide in the reformed gas is further reduced (below 10 ppm) by an oxidation reaction, and such reformed gas is exhaled so as to be inhaled into to the fuel electrode of the fuel cell 10.

In these circumstances, water or steam within the evaporating portion 80 and reformed gas (mixed gas) within the CO purifying portion 90, that abuts onto the evaporating portion 80, flow so as to be concurrent. Thus, water whose temperature is relatively low (e.g., 20° C.) when it is let out through the water inlet 80*a* is heated so as to be boiled (at 100° C.) by heat exchanging with reformed gas (mixed gas) that has been heated and that flows within the CO purifying portion 90. After the heat of the reformed gas (mixed gas) is exchanged with water, the temperature of the reformed gas (mixed gas) is reduced so as to be approximately the same as the temperature of the water let out from the water outlet 80*b* (100° C.). Specifically, the temperature of the reformed gas (mixed gas) is at approximately 200° C. when it is exhaled so as to be to the CO purifying portion 90, and while the reformed gas has been flowing within the CO purifying portion 90, the temperature of the reformed gas has been increased by means of an oxidizing exothermic reaction of carbon monoxide; however, the heat is exchanged with the evaporating portion 80, and as a result, the temperature of the reformed gas has been reduced to approximately 100° C.

Further, the CO purifying portion 90 may be attached to a portion at which the temperature of the evaporating portion 80 is constant and stable. For example, the CO purifying portion 90 may be spaced at a predetermined distance from the water inlet 80a. Because the temperature of the CO purifying portion 90 is increased when the level of the carbon monoxide is reduced, and the CO purifying portion 90 is used for cooling the CO purifying portion 90 and maintained at range of active temperature of the catalyst 90c, it is important that the coolant temperature of the CO purifying portion 90, serving as a cooling meant, is constantly stable. The predetermined distance is determined at a distance within which the water around the water inlet 80a of the evaporating portion 80 and whose temperature is relatively low can be heated to approximately 100° C.

A switching device 91 is provided between the CO purifying portion 90 and the fuel cell 10. While the reforming device 20 is stably operated, the switching device 91 connects the CO purifying portion 90 to the fuel cell 10, and while the reforming device 20 is operated so as to be started, the switching device 91 connect the CO purifying portion 90 to the combusting portion 60 in order not to supply the reformed gas including carbon monoxide at high percentage is relatively high, to the fuel cell 10. Thus, while the reforming device 20 is operated so as to be started, combusting fuel or reformed gas, which is let out from the CO purifying portion 90, is exhaled to the combusting portion 60, and while the reforming device 20 is stably operated, the reformed gas, which is let out from the CO purifying portion 90 is exhaled to a fuel electrode of the fuel cell 10, and anode off-gas including unused hydrogen gas, which is let out from the fuel electrode, is exhaled to the combusting portion 60. In the combusting portion 60, the anode off-gas is combusted.

An actuation of the reforming device 20 having an above configuration will be explained. The combustion gas generated by the combusting portion 60 flows within the inner circumferential channel 71 and the first channel 72a. At this point, the heat is exchanged between the combustion gas and the reforming portion 30.

Then the combustion gas flows within the second channel 72b, and the heat is exchanged between the combustion gas and the evaporating portion 80, and then the combustion gas is exhaled. On the other hand, the water exhaled to the evaporating portion 80 is heated by the heat of the combustion gas flowing within the second channel 72b of the evaporating portion 80, and such heated water is let out to the manifold 45 of the cooling portion 40. At this point, fuel is mixed to the water (or steam), which has been heated, so as to be the mixed gas, and such mixed gas is exhaled to the manifold 45 of the cooling portion 40.

In the cooling portion 40, while the mixed gas reaches the circular manifold 43, the mixed gas is heated by the reformed gas, which is exhaled by the reforming portion 30 and flows within the inner tube 44 so as to be completely vaporized, and then exhaled to the reforming portion 30. In the reforming portion 30, the mixed gas is reformed so as to generate hydrogen gas and carbon monoxide gas. At the same time, the carbon monoxide generated by the steam reforming reaction reacts with the steam so as to be reformed into hydrogen gas and carbon dioxide. This reaction is a co-called carbon monoxide shift reaction. These gases (reformed gases) are let out to the inner tube 44 of the cooling portion 40. While the reformed gas flows through the inner tube 44 of the cooling portion 40, the heat of the reformed gas has been exchanged with the mixed gas through the heat exchange pipe 47, and the temperature of the reformed gas is reduced. Such reformed gas whose temperature has been reduced is let out to the CO shift portion 50.

Within the CO shift portion 50, carbon monoxide in the reformed gas exhaled by the cooling portion 40 exothermic reacts with steam by means of the catalyst 50a. This reaction is a so-called a carbon monoxide shift reaction. By such reaction, the temperature of the CO shift portion 50 is increased and controlled so as to be within a range of active temperature of the catalyst 50a. Further, the reformed gas exhaled by the CO shift portion 50 and air are mixed and exhaled to the CO purifying portion 90 so as to react with catalyst 90c. This reaction is a so-called an oxidizing reaction, which is one of exothermic reaction. By such reaction, the temperature of CO purifying portion 90 can be increased, however, the heat of the CO purifying portion 90 is exchanged with the evaporating portion 80 so as to be within a range of active temperature of the catalyst 90c.

When the reforming device 20 is normally operated, the temperature of the combusting portion 50 becomes approximately 1000° C., that is the highest, the reforming portion 30 becomes 500° C. through 700° C., the cooling portion 40 becomes 200° C. through 600° C., the CO shift portion 50 becomes 200° C. through 300° C., the CO purifying portion 90 becomes 100° C. through 200° C., and the evaporating portion 80 becomes approximate 100° C.

As described above, in this embodiment, the heat is exchanged between the loop-back channel 73 (the inner circumferential channel 71 and the first channel 72a) of the combustion gas channel 70 and the reforming portion loop-back channel R1. Then the heat is also exchanged between the outer circumferential channel 72 (second channel 72b) and the evaporating portion 80. Further, the CO purifying portion 90 serving as a carbon monoxide reducing portion is provided at an outer peripheral surface of the evaporating portion 80. Thus, the chances can be reduced of the heat of the outer circumferential channel 72, within which the combustion gas flows, being emitted outward through the evaporating portion 80 from the outer circumferential wall of the evaporating portion 80. Thus, the possibilities of the thermal efficiency of the reforming device 20 being decreased can be reduced, as a result, a power generation efficiency of the fuel cell system can be maintained at high level.

Further, if the heat insulating portion 75 does not exist, the second channel 72b of the outer circumferential channel 72 may receive the heat from the first channel 72a of the outer circumferential channel 72, however, because the temperature of the first channel 72a is higher, and the heat is not emitted inward; the temperature of the combustion gas flowing within the second channel 72b may not be reduced. In order to increase the level of the starting performance, the level of the combustion load can be increased, or the amount of water supplied to the device can be reduced. Thus, because the water within the evaporating portion 80 can be heated appropriately, a time to start the device can be reduced, as a result, a level of starting performance can be increased. Thus, even when the combustion load is not increased or the amount of water, which is supplied to the device, is reduced; it can be prevented that efficiency is decreased, and further, deterioration by carbon deposition on the reforming catalyst, which reaches a high temperature; reduction on a degree of conversion and increment of consistency of carbon monoxide within CO transformer catalyst layer 10 may occur.

Further, because most of the heat emitted from the second channel 72b is exhaled to the evaporating portion 80, water flowing within the evaporating portion 80 can be appropriately boiled and maintained at the boiled state. Furthermore, because the temperature of the CO purifying portion 90 serving as the carbon monoxide reducing portion can be controlled by means of the evaporating portion 80, even when the load is changed or the environment is changed, the device can stably control with high robustness.

Further, because the heat insulating portion 75b is provided between the second channel 72b and the first channel 72a, the chances can be reduced of the heat of the combustion gas, which flows within the second channel 72b, being emitted inward to the heat insulating portion 75b, as a result, the heat of the combustion gas is emitted only outward to the evaporating portion 80. Thus, the heat is effectively exchanged between the combustion gas and the evaporating portion 80 in order to maintain water in the evaporating portion to be boiled.

Further, because combustion gas within the second channel 72b of the combustion gas channel 70 and water or steam within the evaporating portion 80, abutting to the evaporating portion 80, flow so as to be concurrent, the temperature of combustion gas within the second channel 72b of the combustion gas channel 70 and the temperature water or steam within the evaporating portion 80 become approximately 100° C., and the combustion gas at high temperature is exhaled to and stored in the condenser (not shown), and the stored reformed gas is used in order to heat water in the hot water storage tank (not shown). With respect to such characteristic, a user who considers the fuel cell system as a hot water supplier rather than a power supplier can effectively use this system.

Further, because water or steam within the evaporating portion 80 and reformed gas within the CO purifying portion 90, serving as the carbon monoxide reducing portion and abutting to the evaporating portion 80, flow so as to be concurrent, the temperature of water or steam exhaled by the evaporating portion 80 and the temperature of reformed gas exhaled by the purifying portion 90 become approximately 100° C., and the reformed gas at high temperature is exhaled to and stored in the condenser (not shown), and the stored reformed gas is used in order to heat water in the hot water storage tank (not shown). With respect to such characteristic, a user who considers the fuel cell system as a hot water supplier rather than a power supplier can effectively use this system.

2) A Second Embodiment

Another fuel cell system to which a second embodiment of the reforming device is applied will be explained.

Figure 2:
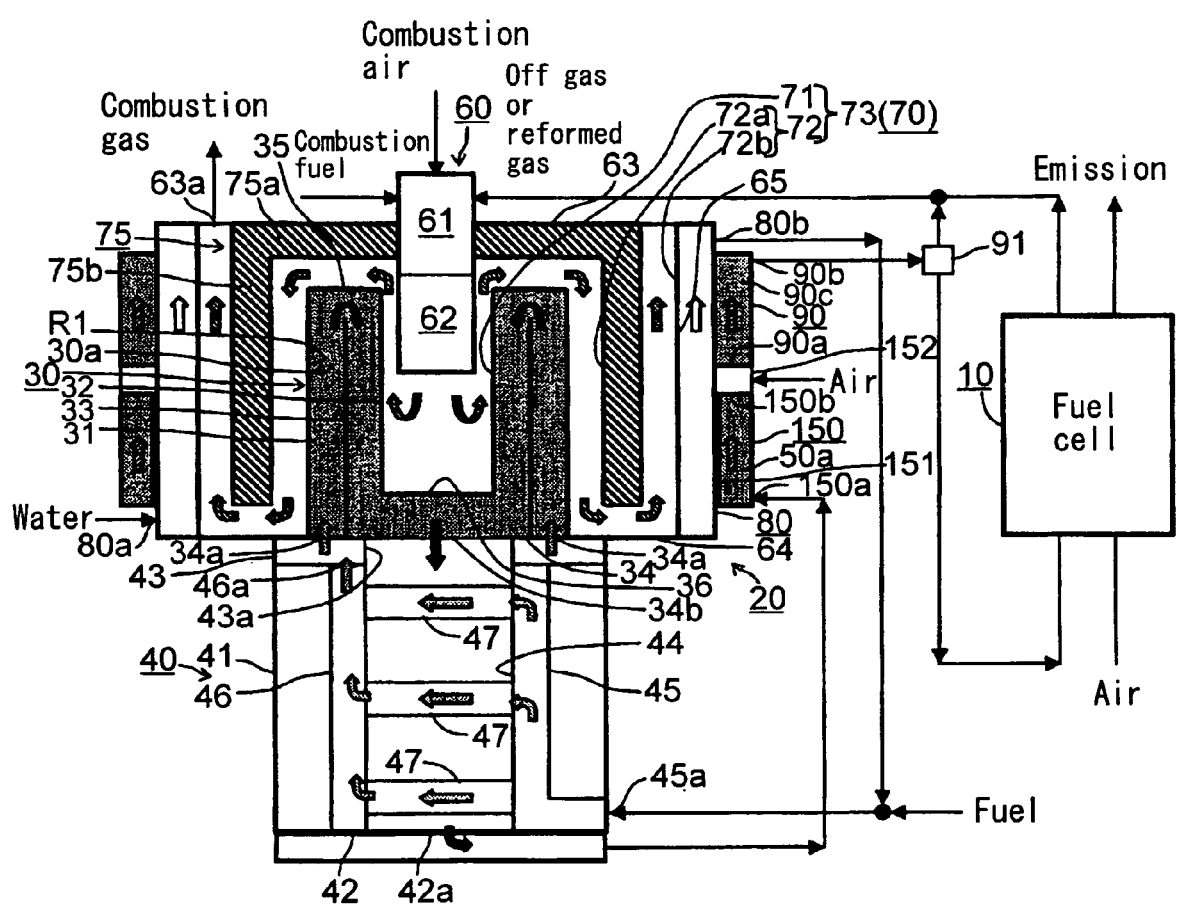
FIG. 2 illustrates a schematic diagram indicating a fuel cell system to which a reforming device of the second embodiment is applied.

FIG. 2 illustrates a schematic view indicating an outline of the fuel cell system according to the second embodiment.

In the same manner as the first embodiment, the fuel cell system in the second embodiment includes the reforming portion, the cooling portion, the CO shift portion, the combusting portion, the combustion gas channel, the heat insulating portion, the evaporating portion and the CO purifying portion.

However, a place where the CO shift portion is attached and a structure thereof differ from the fuel cell system in the first embodiment. The parts in the second embodiment similar to that of the first embodiment are identified with the similar numbers, and explanations thereof will be skipped here.

A CO shift portion 150 of the second embodiment is provided to the outer circumferential wall of the evaporating portion 80 so as to be in a line with the CO purifying portion 90 in its cross section, not below the cooling portion 40.

The CO shift portion 150, also serving as a carbon monoxide reducing portion, is formed in a tube shape, for example in a cylinder shape, and provided so as to cover a part of the outer circumferential wall of the evaporating portion 80 by means of a thermal resistance element 151. A reformed gas inlet 150a is formed on the lower side wall portion of the CO shift portion 150, and a reformed gas outlet 150b is formed on the upper side wall portion of the CO shift portion 150. Further, the CO shift portion 150 is filled with the catalyst 50a (e.g., Ru series or Pt series catalyst), and reformed gas inlet from the reformed gas inlet 150a is let out through the reformed gas outlet 150b after flowing within the CO shift portion 150. Furthermore, the reformed gas inlet 90a of the CO purifying portion 90 is formed at the bottom portion thereof. The thermal resistance element 151 is made of a heat-insulating material such as ceramic.

The water or steam within the evaporating portion 80 and the reformed gas within the CO shift portion 150 abutting to the evaporating portion 80 flows so as to be concurrent. Thus, water whose temperature is relatively low (e.g., 20° C.) when it is exhaled to the water inlet 80a is heated so as to be boiled (at 100° C.) by heat exchanging with the reformed gas, which has been heated and flowing within the CO shift portion 150. Such water further flows downstream (toward an upper portion of the evaporating portion). Specifically, the temperature of the reformed gas (mixed gas) is at approximately 300° C. when it is exhaled to the CO shift portion 150, and while the reformed gas flows within the CO shift portion 150, the temperature of the reformed gas has been increased by means of an oxidizing exothermic reaction of carbon monoxide; however, the heat is exchanged with the evaporating portion 80, as a result, the temperature of the reformed gas has been reduced to approximately 200° C.

The CO shift portion 150 may be provide at the evaporating portion 80 near the water outlet 80b, at which the temperature of the water is relatively high, and the CO purifying portion 90 may be provided at the at the evaporating portion 80 near the water inlet 80a, at which the temperature of the water is relatively low.

In this circumstance, the heat can be exchanged between the evaporating portion 80 and the CO shift portion 150, and the evaporating portion 80 and the CO purifying portion 90 with appropriate thermal balance, at the same time, the device can be further downsized by downsizing the thermal resistance element 151.

The reformed gas outlet 150b of the CO shift portion 150 is connected to the reformed gas inlet 90a of the CO purifying portion 90 by means of the connecting portion 152, which is formed in a circular shape. Air is exhaled to the connecting portion 152, and such air is mixed with the reformed gas outlet from the CO shift portion 150, and the mixed gas is further outlet to the CO purifying portion 90.

In the CO shift portion 150, carbon monoxide in the reformed gas, which is exhaled by the cooling portion 40 and steam reacts with catalyst 50a in order to cause the carbon monoxide shift reaction, which is one of the exothermic reactions. Because the heat is exchanged between the evaporating portion 80 and the CO shift portion 150, the temperature of the reformed gas is controlled so as to be in a range of an active temperature of the catalyst 50a.

Further, the CO shift portion 150 may be attached to a portion at which the temperature of the evaporating portion 80 is constant and stable. For example, the CO shift portion 150 may be spaced at a predetermined distance from the water inlet 80a. Because the temperature of the CO shift portion 150 is increased when the level of the carbon monoxide is reduced, and CO shift portion 150 is used for cooling the CO shift portion 150 and maintained at range of active temperature of the catalyst 90c, it is important that the coolant temperature of the CO shift portion 150, serving as a cooling meant, is constantly stable. The predetermined distance is determined at a distance within which the water around the water inlet 80a of the evaporating portion 80 and whose temperature is relatively low can be heated to approximately 100° C.

In the second embodiment, effects that are identical to the first embodiment can be obtained.

3) Third Embodiment

Figure 3:
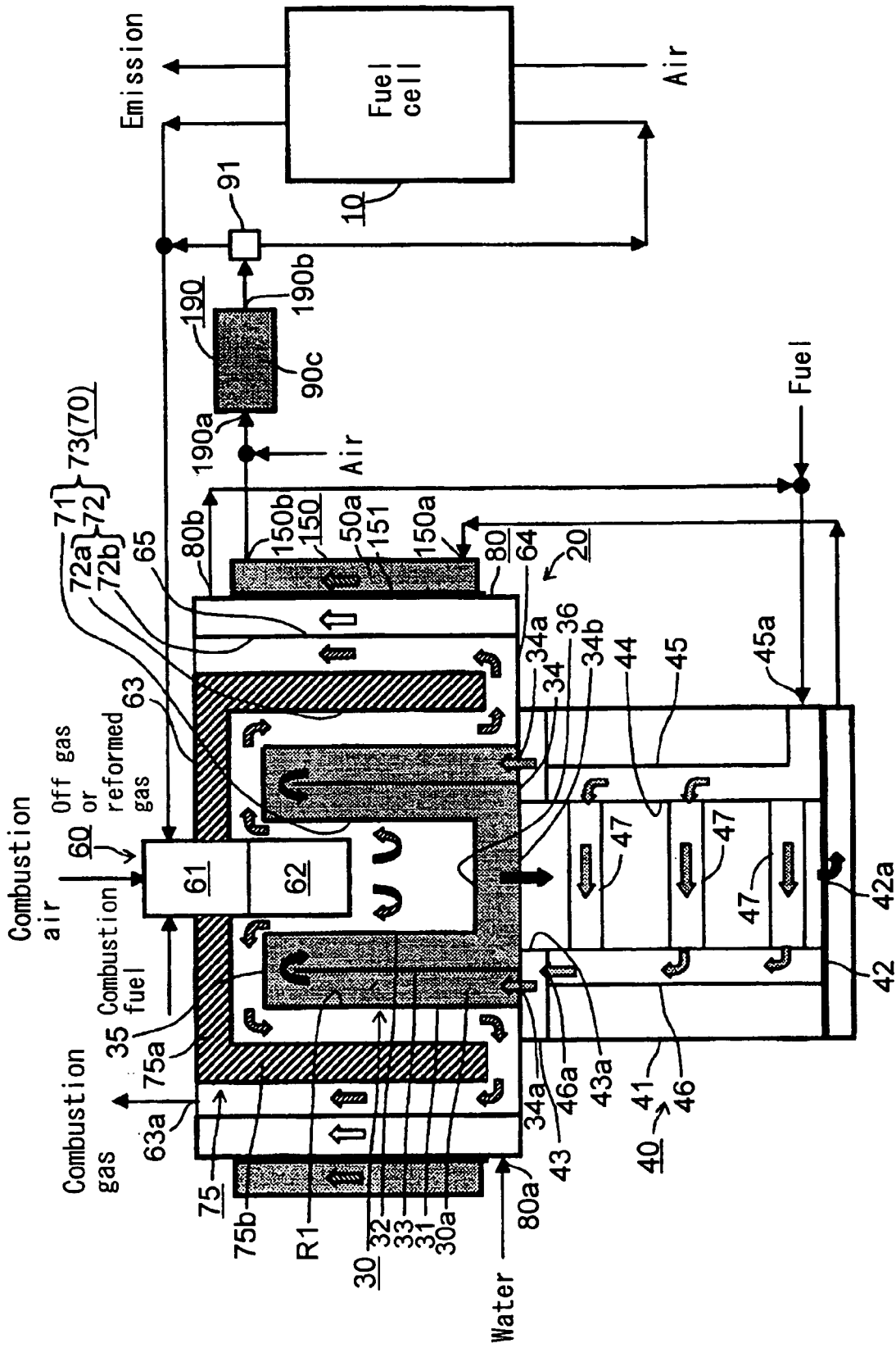
FIG. 3 illustrates a schematic diagram indicating a fuel cell system to which a reforming device of the third embodiment is applied.

Another fuel cell system to which a second embodiment of the reforming device is applied will be explained. FIG. 3 illustrates a schematic view indicating an outline of the fuel cell system according to the third embodiment. In the same manner as the second embodiment, the fuel cell system in the third embodiment includes the reforming portion, the cooling portion, the CO shift portion, the combusting portion, the combustion gas channel, the heat insulating portion, the evaporating portion and the CO purifying portion. However, a place where the CO shift portion is attached and a structure thereof differ from the fuel cell system in the second embodiment. The parts in the third embodiment similar to that of the second embodiment are identified with the similar numbers, and explanations thereof will be skipped here.

In the third embodiment, only the CO shift portion 150 is provided to the outer circumferential wall of the evaporating portion 80, and a CO purifying portion 190 is provided at the other place where the outer circumferential wall of the evaporating portion 80 is not provided. The CO purifying portion 190, whose shape is not limited to a particular shape, serves as a carbon monoxide reducing portion for reducing the level of the carbon monoxide within the reformed gas and for supplying such reformed gas to the fuel cell 10. Specifically, the CO purifying portion 190 includes a reformed gas inlet 190a and a reformed gas outlet 190b, and is filled with the catalyst 90c. The reformed gas inlet from the reformed gas inlet 190a flows within the CO purifying portion 190, and then let out through the reformed gas outlet 190b. The reformed gas exhaled to the reformed gas inlet 190a is a mixture of the reformed gas, which is let out from the CO shift portion 150 and air. A cooling means may be provided in order to cool the CO purifying portion 190. In the third embodiment, effects that are identical to the first embodiment can be obtained.

In each of the above embodiments, the CO purifying portion 90 and the CO shift portion 150 are formed in a cylinder; however, a notch may be formed on the CO purifying portion 90 and the CO shift portion 150, or plural tubes whose cross section is formed in a circular arc shape may be provided so as to be spaced in a circumferential direction.

Figure 4:
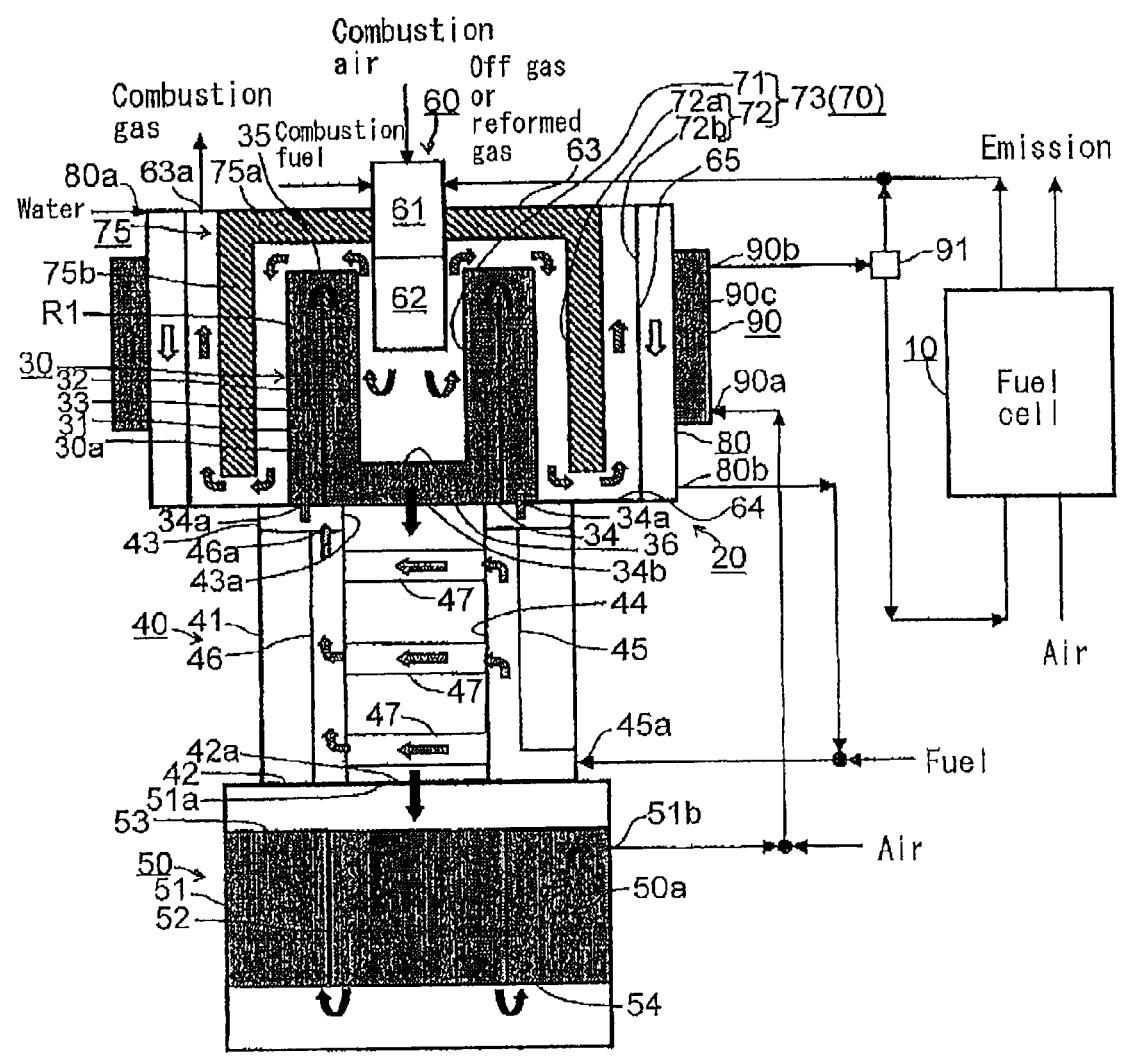
FIG. 4 illustrates a schematic diagram indicating a fuel cell system to which a variation of a reforming device of the first embodiment is applied.
Figure 5:
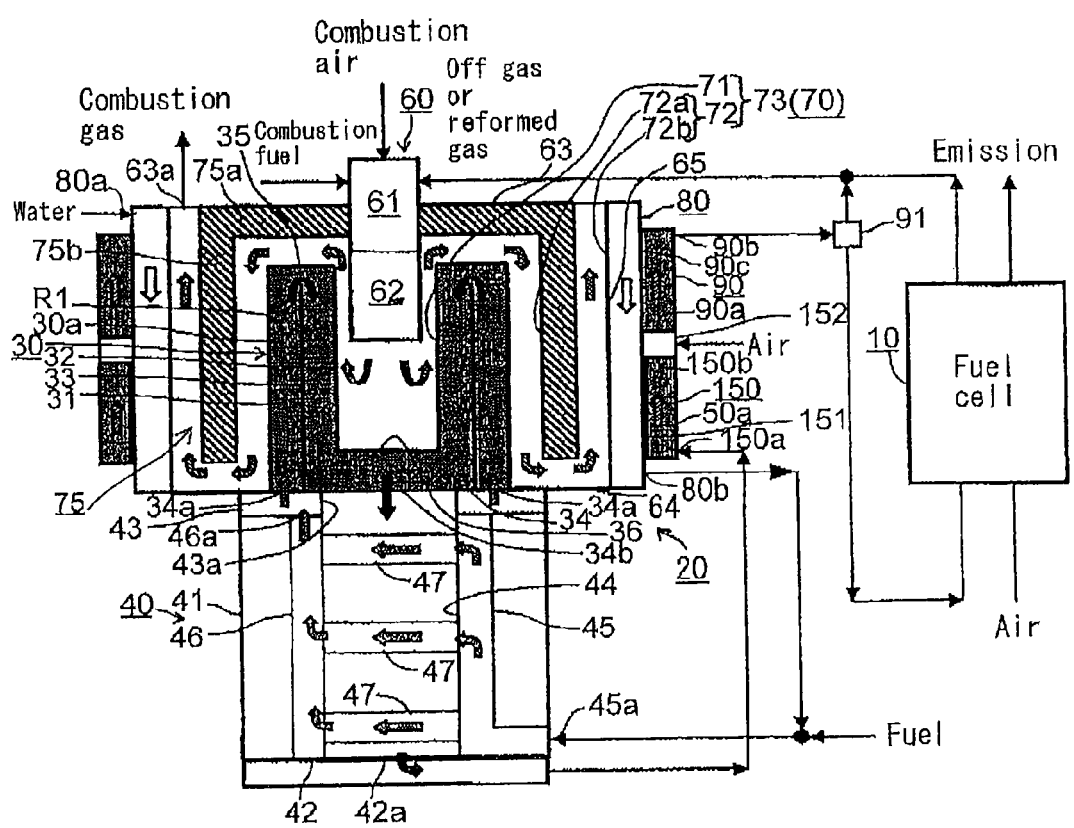
FIG. 5 illustrates a schematic diagram indicating a fuel cell system to which a variation of a reforming device of the second embodiment is applied.

In each of the above embodiments, the second channel 72b of the combustion gas channel 70 is provided so as to abut to the evaporating portion 80 in a manner where the combustion gas within the second channel 72b and water or steam within the evaporating portion 80 flow so as to be concurrent; however, they are positioned in a manner where the combustion gas within the second channel 72b and water or steam within the evaporating portion 80 flow so as to be countercurrent, as shown in FIGS. 4 and 5, for example. Thus, the temperature of the combustion gas that is let out from the second channel 72b of the combustion gas channel 70 can be reduced to the temperature of water that is inlet to the evaporating portion 80, for example reduced to 20° C. Because the heat can be exchanged between the combustion gas, which flows so as to be countercurrent to water, and water with higher efficiency comparing the heat of the combustion gas, which flows so as to be concurrent to water, power generation efficiency of the fuel cell system can be improved.

In each of the above embodiments, the CO purifying portion 90 (or the CO shift portion 150), which is serving as a carbon monoxide reducing portion, is provided so as to abut to the evaporating portion 80 in a manner where the reformed gas within the CO purifying portion 90 (or the CO shift portion 150) and water or steam within the evaporating portion 80 flow so as to be concurrent; however, they are positioned in a manner where the reformed gas and water or steam flow so as to be countercurrent, as shown in FIGS. 4 and 5, for example. Thus, the temperature of the reformed gas that is let out from the carbon monoxide reducing portion can be reduced to the temperature of water that is inlet to the evaporating portion 80, for example reduced to 20° C. Because the heat of the reformed gas, which flows so as to be countercurrent to water, can be transmitted to water with higher efficiency comparing the heat of the combustion gas, which flows so as to be concurrent to water, power generation efficiency of the fuel cell system can be improved.

In each of the above embodiments, the present invention is applied to the reforming device having the reforming portion for executing the steam reforming reaction, however, the present invention may be applied to a reforming device having a reforming portion for executing a partial oxidation reforming reaction.

In each of the above embodiments, the reforming portion loop-back channel R1, the inner circumferential channel 71 of the combustion gas channel 70, the first channel 72a and second channel 72b are formed in a circular cylinder shape or a ring shape, however, the shapes is not limited and may be modified.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A reforming device comprising:
 a reforming portion that generates reformed gas from a mixed gas, in which fuel and steam are mixed, and exhales such reformed gas;
 a combusting portion that generates combustion gas used for heating the reforming portion;
 a combustion gas channel within which combustion gas channel the combustion gas flows;
 an evaporating portion that generates steam by heating water and supplies the steam to the reforming portion; and
 a carbon monoxide reducing portion that reduces a level of carbon monoxide in the reformed gas that has been exhaled by the reforming portion, and supplies such reformed gas to a fuel cell, wherein
 the combustion gas channel is provided along an inner circumferential wall of the evaporating portion,
 the carbon monoxide reducing portion is provided along an outer circumferential wall of the evaporating portion,
 the reforming portion includes a tube shape,
 the combustion portion is provided at an inner circumference of the reforming portion,
 the combustion gas channel includes a loop-back channel including an inner circumferential channel, which inner circumferential channel is provided along an inner circumferential wall of the reforming portion, and an outer circumferential channel, which outer circumferential channel is provided at an outer circumference along an outer circumferential wall of the reforming portion, the inner circumferential channel being connected to the outer circumferential channel, and the evaporating portion is provided at an outer circumferential wall of the outer circumferential channel; and wherein the reforming portion includes a loop-back channel, the loop-back channel includes an outer flow path and an inner flow path, and wherein the reformed gas within the reforming portion loop-back channel flows from the outer flow path to the inner flow path.

2. The reforming device according to claim 1, wherein the outer circumferential channel includes a first channel, which is positioned along the outer circumferential wall of the reforming portion, and a second channel, which is provided at an outer circumference of the first channel so as to be connected thereto; and the evaporating portion is provided at an outer circumferential wall of the second channel.

3. The reforming device according to claim 2, wherein a heat insulating portion is provided between the first channel and the second channel.

4. The reforming device according to claim 1, wherein combustion gas within the combustion gas channel and water or steam within the evaporating portion that abuts onto the combustion gas channel, flow so as to be concurrent.

5. The reforming device according to claim 1, wherein water or steam within the evaporating portion and reformed gas within the carbon monoxide reducing portion that abuts onto the evaporating portion, flow so as to be concurrent.

6. The reforming device according to claim 1, wherein combustion gas within the combustion gas channel and water or steam within the evaporating portion that abuts onto the evaporating portion, flow so as to be countercurrent.

7. The reforming device according to claim 1, wherein water or steam within the evaporating portion, and reformed gas within the carbon monoxide reducing portion that abuts onto the evaporating portion, flow so as to be countercurrent.

8. The reforming device according to claim 1, wherein combustion gas within the combustion gas channel, and water or steam within the evaporating portion that abuts onto the combustion gas channel, flow so as to be concurrent, and water or steam within the evaporating portion and reformed gas within the carbon monoxide reducing portion that abuts onto the evaporating portion, flow so as to be concurrent.

9. The reforming device according to claim 1, wherein the carbon monoxide reducing portion includes a carbon monoxide purifying portion for reducing a level of carbon monoxide in the reformed gas by an oxidation reaction.

10. The reforming device according to claim 1, wherein the carbon monoxide reducing portion includes a carbon monoxide shift reaction portion for reducing a level of carbon monoxide in the reformed gas by a carbon monoxide shift reaction.

11. The reforming device according to claim 1, wherein the carbon monoxide reducing portion includes a carbon monoxide purifying portion for reducing a level of carbon monoxide in the reformed gas by an oxidation reaction and a carbon monoxide shift reaction portion for reducing a level of carbon monoxide in the reformed gas by a carbon monoxide shift reaction.

12. A reforming device comprising:
a reforming portion that generates reformed gas from a mixed gas, in which fuel and steam are mixed and exhales such reformed gas;
a combusting portion that generates combustion gas used for heating the reforming portion;
a combustion gas channel within which combustion gas channel the combustion gas flows;
an evaporating portion that generates steam by heating water and supplies the steam to the reforming portion; and
a carbon monoxide reducing portion that reduces a level of carbon monoxide in the reformed gas that has been exhaled by the reforming portion, and supplies such reformed gas to a fuel cell, wherein
the reforming portion includes a tube shape, an inner flow path extending along an axis line of the reforming portion, and an outer flow path extending along an axis line of the reforming portion and provided at an outer circumference of the inner flow path so as to extend along an axis line of the inner flow path, the inner flow path being connected to the outer flow path at one end thereof,
the combustion portion is provided at an inner circumference of the reforming portion,
the combustion gas channel includes an inner circumferential channel and an outer circumferential channel, the inner circumferential channel being provided so as to be along an inner circumferential wall of the reforming portion, and the outer circumferential channel includes a first channel, which is positioned along the outer circumferential wall of the reforming portion, and a second channel, which is provided at an outer circumference of the first channel so as to be loop-backed and connected thereto,
the evaporating portion is provided at an outer circumferential wall of the outer circumferential channel, and
the carbon monoxide reducing portion is provided at an outer circumferential wall of the evaporating portion; and
wherein the reformed gas within the reforming portion flows from the outer flow path to the inner flow path.

13. The reforming device according to claim 12, wherein combustion gas within the combustion gas channel and water or steam within the evaporating portion that abuts onto the combustion gas channel, flow so as to be concurrent.

14. The reforming device according to claim 12, wherein water or steam within the evaporating portion and reformed gas within the carbon monoxide reducing portion that abuts onto the evaporating portion, flow so as to be concurrent.

15. The reforming device according to claim 12, wherein combustion gas within the combustion gas channel and water or steam within the evaporating portion that abuts onto the evaporating portion, flow so as to be countercurrent.

16. The reforming device according to claim 12, wherein water or steam within the evaporating portion, and reformed gas within the carbon monoxide reducing portion that abuts onto the evaporating portion, flow so as to be countercurrent.

17. The reforming device according to claim 12, wherein combustion gas within the combustion gas channel, and water or steam within the evaporating portion that abuts onto the combustion gas channel, flow so as to be concurrent, and water or steam within the evaporating portion and reformed gas within the carbon monoxide reducing portion that abuts onto the evaporating portion, flow so as to be concurrent.

18. The reforming device according to claim 12, wherein a heat insulating portion is provided between the first channel and the second channel.

* * * * *